US007227952B2

(12) United States Patent
Qawami et al.

(10) Patent No.: US 7,227,952 B2
(45) Date of Patent: Jun. 5, 2007

(54) SYSTEM, METHOD, AND DEVICE FOR PLAYING BACK RECORDED AUDIO, VIDEO OR OTHER CONTENT FROM NON-VOLATILE MEMORY CARDS, COMPACT DISKS OR OTHER MEDIA

(75) Inventors: Bahman Qawami, San Jose, CA (US); Farshid Sabet-Sharghi, San Jose, CA (US); Robert C. Chang, Danville, CA (US)

(73) Assignee: SanDisk Corporation, Milpitas, CA (US)

( * ) Notice: Subject to any disclaimer, the term of this patent is extended or adjusted under 35 U.S.C. 154(b) by 766 days.

(21) Appl. No.: 10/006,465

(22) Filed: Dec. 6, 2001

(65) Prior Publication Data
US 2002/0176575 A1 Nov. 28, 2002

Related U.S. Application Data

(60) Provisional application No. 60/251,731, filed on Dec. 7, 2000.

(51) Int. Cl.
*H04N 7/167* (2006.01)
*G06F 12/14* (2006.01)
*H04K 1/00* (2006.01)

(52) U.S. Cl. .................. 380/201; 713/193; 705/57; 705/67

(58) Field of Classification Search ................ 380/201; 705/57, 67; 713/193
See application file for complete search history.

(56) References Cited

U.S. PATENT DOCUMENTS 4,465,901 A  8/1984  Best
4,779,252 A  10/1988 Custers et al.
5,604,801 A * 2/1997  Dolan et al. ................. 713/159
5,790,423 A * 8/1998  Lau et al. ..................... 700/94
5,805,821 A * 9/1998  Saxena et al. ............. 709/231
6,040,622 A  3/2000  Wallace ....................... 257/679
6,069,952 A * 5/2000  Saito et al. ................... 705/57
6,289,102 B1 9/2001  Ueda et al.
6,332,175 B1 12/2001 Birrell et al.
6,367,019 B1 * 4/2002  Ansell et al. ............... 713/201
6,611,812 B2 8/2003  Hurtado et al.

(Continued)

FOREIGN PATENT DOCUMENTS

| DE | 3512785 | 10/1986 |
| DE | 3601526 | 7/1987 |
| EP | 0 138 219 A2 | 4/1985 |
| EP | 0 191 324 A2 | 8/1986 |
| EP | 0 198 384 | 10/1986 |
| EP | 0725512 A2 | 8/1996 |

(Continued)

OTHER PUBLICATIONS

Intel Corporation, et al., "Content Protection for Recordable Media Specification—SD Memory Card Book," Revision 0.95, May 28, 2001.

(Continued)

*Primary Examiner*—Emmanuel L. Moise
*Assistant Examiner*—Michael Pyzocha
(74) *Attorney, Agent, or Firm*—Winston & Strawn LLP

(57) ABSTRACT

A secure software system for a portable device or computer that provides a simple interface to the device or computer and that retrieves and dynamically decrypts keys and content from a secure media while minimizing exposure of the keys and eliminating the need for manufacturers of the device or computer to create a their own system to manage these complex processes.

10 Claims, 11 Drawing Sheets

U.S. PATENT DOCUMENTS

| | | | |
|---|---|---|---|
| 6,615,192 B1* | 9/2003 | Tagawa et al. | 705/57 |
| 6,832,293 B1* | 12/2004 | Tagawa et al. | 711/115 |
| 6,865,431 B1* | 3/2005 | Hirota et al. | 700/94 |
| 2001/0021255 A1 | 9/2001 | Ishibashi | |
| 2001/0032088 A1* | 10/2001 | Utsumi et al. | 705/1 |
| 2003/0014371 A1* | 1/2003 | Turgeon | 705/71 |

FOREIGN PATENT DOCUMENTS

| | | |
|---|---|---|
| EP | 1028425 A2 | 8/2000 |
| EP | 1047062 A2 | 10/2000 |
| EP | 1047062 A3 | 10/2000 |
| FR | 2592502 | 3/1987 |
| WO | 87/05726 | 9/1987 |
| WO | 01/67668 A | 9/2001 |

OTHER PUBLICATIONS

Intel Corporation, et al., "Content Protection for Recordable Media Specification—Introduction and Common Cryptographic Elements," Revision 0.94, Oct. 18, 2000.

Intel Corporation, et al., "Content Protection for Recordable Media Specification—DVD Book," Revision 0. 95, May 31, 2001.

Intel Corporation, et al., "C2 Block Cipher Specification," Revision 0.9, Jan. 11, 2000.

MMCA Technical Committee, "The MultiMediaCard—System Specification," Version 2.11, Jun. 1999.

SanDisk Corporation, "MultiMediaCard Product Manual," Revision 2, Apr. 2000.

EPO/ISA, "International Search Report", mailed in PCT/US01/46661 on Nov. 19, 2004, 8 pages.

IPEA/European Patent Office, "International Preliminary Exam Report", mailed in corresponding PCT/US01/14661, Jan. 18, 2005, 10 pages.

MMCA Technical Committee, Keitaide-Music Technical Specification Memory Card, Version 0.90, http://www.mmca.org/tech/appli.pdf, Jun. 15, 2000, pp. I-52.

Ramaswamy, R., "Application of a Key Generation and Distribution Algorithm for Secure Communication in Open Systems Interconnection Architecture", Proceedings 1989 International Carnahan Conference on Security Technology, Oct. 3, 1989, pp. 175-180.

Rousselet, P., "High-Security Messaging, A Highly Secure Message Handling System", Securicom 86, 4th Worldwide Congress on Computer and Communications Security and Protection, Mar. 1986, pp. 197-211 (translation and Certificate of Translation included), 31 pages.

Electronic Banking and Finance, "Mastercard and Visa Introduce Chip Cards", vol. 2, No. 9, Nov. 1985, pp. 6-7.

van der Meulen, Y.J. et al., "Memory Access to a Chip Card", IBM Technical Disclosure Bulletin, vol. 24, No. 7B, Dec. 1981, pp. 3883-3884.

Guillou, Louis C., "Knowledge Through a New Public-Key Technique: Zero-Knowledge Proof!", Radio and Television Braodcasting, Issue No. 99, 1987, pp. 10-18 (Translation and Certificate of Translation included) 34 pages.

Kunz, R., "The Chip Card—Multifunction Card of the Future", Hasler Review, vol. 19, No. 4, 1986, pp. 70-78.

Weimann, Jürgen, "Security Problems Concerning Chip-Card Applications", Securicom 84, 2nd Worldwide Congress on Computer and Communications Security and Protection, Feb.-Mar. 1984, pp. 141-147.

Torres, E.P., "Optical Memory Card: The Alternative With Built-In Immunity (Tarjeta de Memoria Óptica Alternativa de Alta Immunidad)", Mundo Electronico, No. 179, Dec. 1987, pp. 63-67.

Gorn, W., "Data Protection and Data Security in Btx-Systems (Datenschutz and Datensicherung bei Btx)", Net Nachrichten Elektronik + Telematik, Apr. 1985, pp. 94-96.

Huba, B., "Application Possibilities of Smart Memory Cards in Videotex Systems (Az aktiv memóriakártya alkalmazási lehetöségei videotext rendszerekben)", Informacio Elektronika, vol. 21, No. 5, 1986, pp. 265-275.

Schaumuller-Bichl, I., "The Chip Card and Its Significance in Cryptographic Systems (Chipkarten und ihre Bedeutung in krytographischen Systemen)", Elektrotechnik und Maschinenbau, vol. 104, No. 12, Dec. 1987, pp. 543-546.

Office Action mailed in U.S. Appl. No. 10/006,554 on Apr. 8, 2005, 31 pages.

IPEA/European Patent Office, "International Preliminary Examination Report", mailed in corresponding PCT/US01/47014, Sep. 6, 2004, 5 pages.

ISA/European Patent Office, "International Search Report", mailed in corresponding PCT/US01/47014, Aug. 18, 2004, 5 pages.

ISA/European Patent Office, "Partial International Search", mailed in corresponding PCT/US01/4661, Aug. 18, 2004, 5 pages.

MMCA Technical Committee, "The MultimediaCard System Summary, Based on System Specification Version 2.2", www.verbatim.com.au/tecnotes/MMC$_{13}$ Rev 1.0.pdf, Jan. 2000, pp. 1-27.

Intel Corporation et al., "Content Protection for Recordable Media Specification: DVD Book", http://www.4centity.com/4centity/tech/cprm/, Revision 0.94, Oct. 18, 2000, 46 pages.

* cited by examiner

SYSTEM, METHOD, AND DEVICE FOR PLAYING BACK RECORDED AUDIO, VIDEO OR OTHER CONTENT FROM NON-VOLATILE MEMORY CARDS, COMPACT DISKS OR OTHER MEDIA

CROSS REFERENCE TO RELATED APPLICATIONS

This application is related to and claims priority from U.S. Provisional Patent Application Ser. No. 60/251,731 entitled "SECURE SOFTWARE SYSTEM FOR PLAYING BACK RECORDED AUDIO, VIDEO OR OTHER CONTENT FROM NON-VOLATILE MEMORY CARDS, COMPACT DISKS OR OTHER MEDIA" filed Dec. 7, 2000, and is related to U.S. patent application Ser. No. 10/006,554 entitled "SYSTEM, METHOD, AND DEVICE FOR PLAYING BACK RECORDED AUDIO, VIDEO OR OTHER CONTENT FROM NON-VOLATILE MEMORY CARDS, COMPACT DISKS OR OTHER MEDIA," filed concurrently on the same day as this application and having the same inventors as this application.

Source code is submitted on a compact disc according to 37 CFR 1.52 as an appendix containing the following files, each of which is hereby incorporated by this reference in its entirety: Sd_security\Sd_oem\Makefile, Nov. 5, 2001, 2 KB; Sd_security\Sd_oem\Readme, Nov. 5, 2001, 3 KB; Sd_security\Sd_oem\Sd_oem.c, Nov. 5, 2001, 6 KB; Sd_security\Sd_oem\Sd_oem.h, Nov. 5, 2001, 1 KB; Sd_security\Sd_oem\Sd_oem.inc, Nov. 5, 2001, 1 KB; Sd_security\Sd_oem\Sdtypes.h, Nov. 5, 2001, 3 KB; Sd_security\Sd_oem\vssver.scc, Nov. 5, 2001, 1 KB; Sd_security\Security\Tstsampl\Dotest.c, Nov. 5, 2001, 8 KB; Sd_security\Security\Tstsampl\Makefile, Nov. 5, 2001, 4 KB; Sd_security\Security\Tstsampl\Readme, Nov. 5, 2001, 3 KB; Sd_security\Security\Tstsampl\Regress.c, Nov. 5, 2001, 26 KB; Sd_security\Security\Tstsampl\Sdls.c, Nov. 5, 2001, 10 KB; Sd_security\Security\Tstsampl\Sdrm.c, Nov. 5, 2001, 5 KB; Sd_security\Security\Tstsampl\Securmmc.c, Nov. 5, 2001, 6 KB; Sd_security\Security\Tstsampl\Tstsampl.inc, Nov. 5, 2001, 1 KB; Sd_security\Security\Tstsampl\vssver.scc, Nov. 5, 2001, 1 KB; Sd_security\Security\Err.h, Nov. 5, 2001, 1 KB; Sd_security\Security\Fsentry.c, Nov. 5, 2001, 7 KB; Sd_security\Security\keyInfo.h, Nov. 5, 2001, 84 KB; Sd_security\Security\Makefile, Nov. 5, 2001, 3 KB; Sd_security\Security\Readme, Nov. 5, 2001, 4 KB; Sd_security\Security\Scdrv.c, Nov. 5, 2001, 29 KB; Sd_security\Security\Scdrv.h, Nov. 5, 2001, 5 KB; Sd_security\Security\Scfs.c, Nov. 5, 2001, 13 KB; Sd_security\Security\Scfs.h, Nov. 5, 2001, 4 KB; Sd_security\Security\Sdsec.h, Nov. 5, 2001, 5 KB; Sd_security\Security\Sdsys.c, Nov. 5, 2001, 2 KB; Sd_security\Security\Security.c, Nov. 5, 2001, 64 KB; Sd_security\Security\Smanager.c, Nov. 5, 2001, 7 KB; Sd_security\Security\Smanager.h, Nov. 5, 2001, 2 KB; Sd_security\Security\Ssmapi.c, Nov. 5, 2001, 3 KB; Sd_security\Security\vssver.scc, Nov. 5, 2001, 1 KB;Sdaudlib\HostFunc.c, Nov. 5, 2001, 3 KB; Sdaudlib\Inpoutp.c, Nov. 5, 2001, 1 KB; Sdaudlib\mssccprj.scc, Nov. 5, 2001, 1 KB; Sdaudlib\plmInfo.h, Nov. 5, 2001, 16 KB; Sdaudlib\Sd_plm.h, Nov. 5, 2001, 5 KB; Sdaudlib\Sd_tkm.h, Nov. 5, 2001, 4 KB; Sdaudlib\Sd_types.h, Nov. 5, 2001, 2 KB; Sdaudlib\Sdapi.h, Nov. 5, 2001, 2 KB; Sdaudlib\Sdaudapi.c, Nov. 5, 2001, 91 KB; Sdaudlib\Sdaudapi.h, Nov. 5, 2001, 8 KB; Sdaudlib\Sdaudlib.dsp, Nov. 5, 2001, 4 KB; Sdaudlib\Sdaudlib.dsw, Nov. 5, 2001, 1 KB; Sdaudlib\vssver.scc, Nov. 5, 2001, 1 KB.

BACKGROUND

1. Field of the Invention

This invention relates generally and specifically to secure playback of digital audio, video or other content from memory cards, compacts disks or other media.

2. Related Art

The potential of electronic distribution of copyrighted music over the Internet, by other communication systems or through retail kiosks, is being limited by concerns about unauthorized copying of the music. This is also the case for other audio, as well as video, content. The content is typically provided to the ultimate customer in encrypted form, and the customer records the encrypted content files onto some storage media, such as a personal computer memory, a memory of a portable playing device, a writable compact disk (CD) or a non-volatile memory card. Providers of the content would like to eliminate the possibility of unauthorized copying of the content but have to be satisfied with taking steps that minimize the amount of copying that occurs. This includes providing protection of the content on the recording media. The protection of content stored on non-volatile memory cards is described herein, as specific examples, but the same content protection techniques can be applied to compact disks or other recordable media.

There are several commercially available non-volatile memory cards that are suitable for use as the content data storage media. One is the CompactFlash (CF) card, another is the MultiMediaCard (MMC), and yet another is the Secure Digital (SD) memory card that is closely related to the MMC card. All three, and others, are available in various storage capacities from SanDisk Corporation of Sunnyvale, Calif., assignee of the present application. The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. The MMC products are also described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same in plan view. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card. The electrical interface of the SD Card, and its operation, are described in co-pending patent application Ser. No. 09/641,023, filed Aug. 17, 2000, which application is incorporated herein in its entirety by this reference.

SUMMARY OF THE INVENTION

Encrypted content is difficult to access, and memory cards or compact disks with encrypted content each have specific structures that require specific commands and routines to access encrypted and unencrypted content. The software of the present invention is a simple solution that any original equipment manufacturer (OEM) can install and run on a myriad of different types of devices having a myriad of different types of microprocessors. These devices range from personal computers to portable devices to car stereos, and include any device from which one would like to access content that may be encrypted. The portable devices may be portable audio players or cell phones or portable organizers or generally any microprocessor controlled portable device. The storage media may be flash memory or any type of recordable disk. The devices may have a simple or powerful microprocessor with a small or large amount of memory. The software utilizes and requires only a small buffer for encryption purposes and is designed to run efficiently even in environments with limited processing power and memory. It can be run by any type of general purpose microprocessor, special purpose microprocessors such as a DSP, or an ASIC. Additionally, computationally demanding portions of the software, such as the encryption and decryption (security) engine may be executed by the DSP while other portions of the software may be executed by a another microprocessor or an ASIC.

The software has audio, video and image interfaces to receive commands for each of the respective types of files. These interfaces can organize playback and recording, including managing playlists and other convenient features. Thus, whatever the device, it need only issue a command to an interface and the software will take care of reading or writing data from the secure media, and decoding and decompressing the data from any well known audio, video or image file formats within the audio video or image engines.

The encryption and decryption takes place in an isolated module that is very difficult to access and thus isolated from any attempts from unauthorized persons wishing to access encryption keys in order to copy the files from the media or the device. Content is only decrypted in small portions, and a method of dynamic key generation and deletion minimizes exposure of decrypted keys.

DETAILED DESCRIPTION

Figure 1:
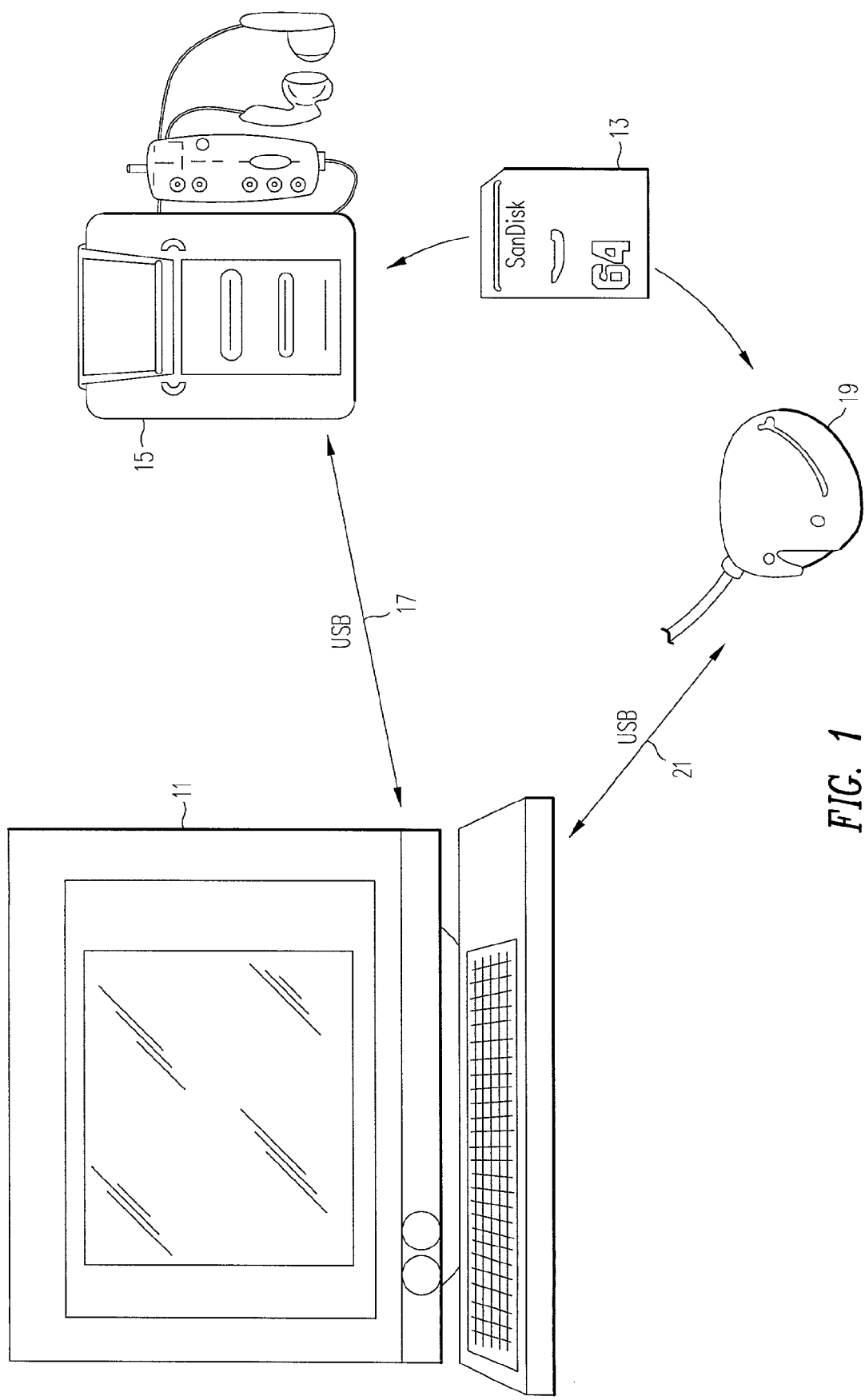
FIG. 1 is an illustration of the devices used to read and write information on a secure media.

With reference to FIG. 1, an exemplary system is described in which content protection is applied to audio content such as music. A host computer device 11 may be a personal computer (PC), as shown, a kiosk located in a retail store to distribute music or other content, or the like. An SD memory card 13 is used in this example to store music. The card 13 is insertable into a utilization device, in this case a portable device (PD) 15 that operates from batteries to play the music or other audio content recorded on the card 13 through personal earphones. The music may be stored on the card 13 when inserted into the device 15 by connecting the device 15 to the host 11, such as through a computer universal serial bus (USB) connection 17. Alternatively, if the player device 15 is not provided with the capability of recording content onto the card 13, or if it is otherwise desirable, a card writer/reader 19 may be connected to the computer through a USB connection 21, and the card 13 inserted into it for recording music on the card. The card 13 is then removed from the writer/reader 19 and inserted into the portable device 15 to play the audio content recorded on the card. The host 11 is termed a licensed compliant module (LCM) when it includes the software necessary to write to and read from the card 13 content data in accordance with the security and authentication protocols of the 4C Entity and the SD Group.

Figure 2:
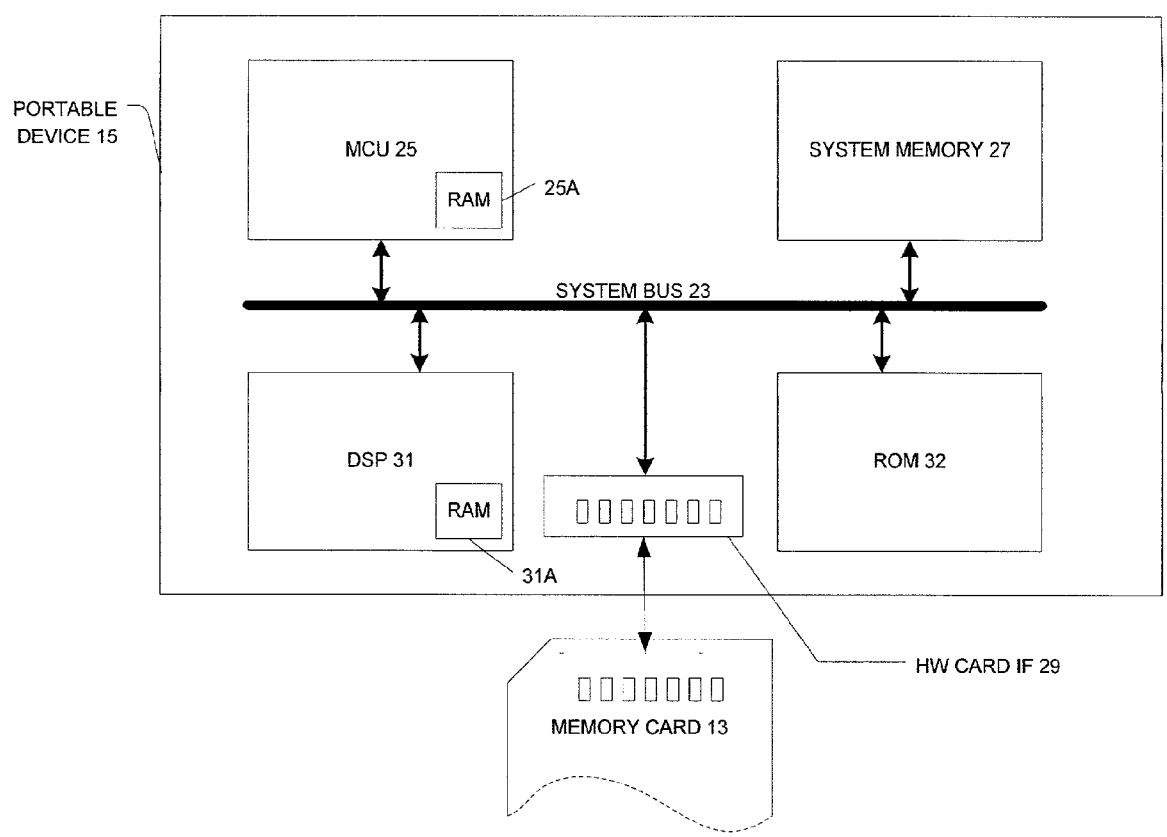
FIG. 2 is a schematic diagram of a device used to access the secure media.

The electronic system within the example portable utilization device 15 is illustrated in FIG. 2. Operably connected together through a bus 23 are a computing unit (MCU) 25, preferably with some non-volatile flash memory 25A, system memory 27, which is preferably a high speed random access memory (RAM), and interface circuits 29 for connecting with the memory card 13. The USB connection 17 is also optionally provided to the MCU 25. A digital signal processor (DSP) 31 is also included, when needed, for decompressing and/or decrypting content data, such as audio or video data, that is stored in a compressed and/or encrypted form. DSP 31 also has its own RAM memory 31A included as part of the processor. DSP 31 may or may not be included. Furthermore, if a DSP processor is included, it may perform the functionality of MCU 25, and thus MCU 25 may therefore be eliminated. Read only memory (ROM) 32 can store part or all of the software of the invention. Software instructions and data in ROM 32 can be executed or read directly from ROM 32 or first shadowed into any RAM memory included in the circuitry of the device.

Specifications for the protection of content on recordable media have been jointly established by Intel Corporation, International Business Machines Corporation, Matsushita Electric Industrial Co., Ltd. and Toshiba Corporation (4C Entity). Particularly relevant here are the following three publications of the 4C Entity, which are expressly incorporated herein by this reference: "Content Protection for Recordable Media Specification, Introduction and Common Cryptographic Elements," Revision 0.94, October, 2000, "Content Protection for Recordable Media Specification, SD Memory Card Book," Revision 0.95, May, 2001, and "C2 Block Cipher Specification," Revision 0.9, Jan. 11, 2000, and "Content Protection for Recordable MediaSpecification, DVD Book," Revision 0.95, May 2001. Additional detailed specifications for implementing these 4C Entity specifications on SD memory cards have been established by Matsushita Electric Industrial Co., Ltd. (MEI), SanDisk Corporation and Toshiba Corporation (SD Group).

Figure 3A:
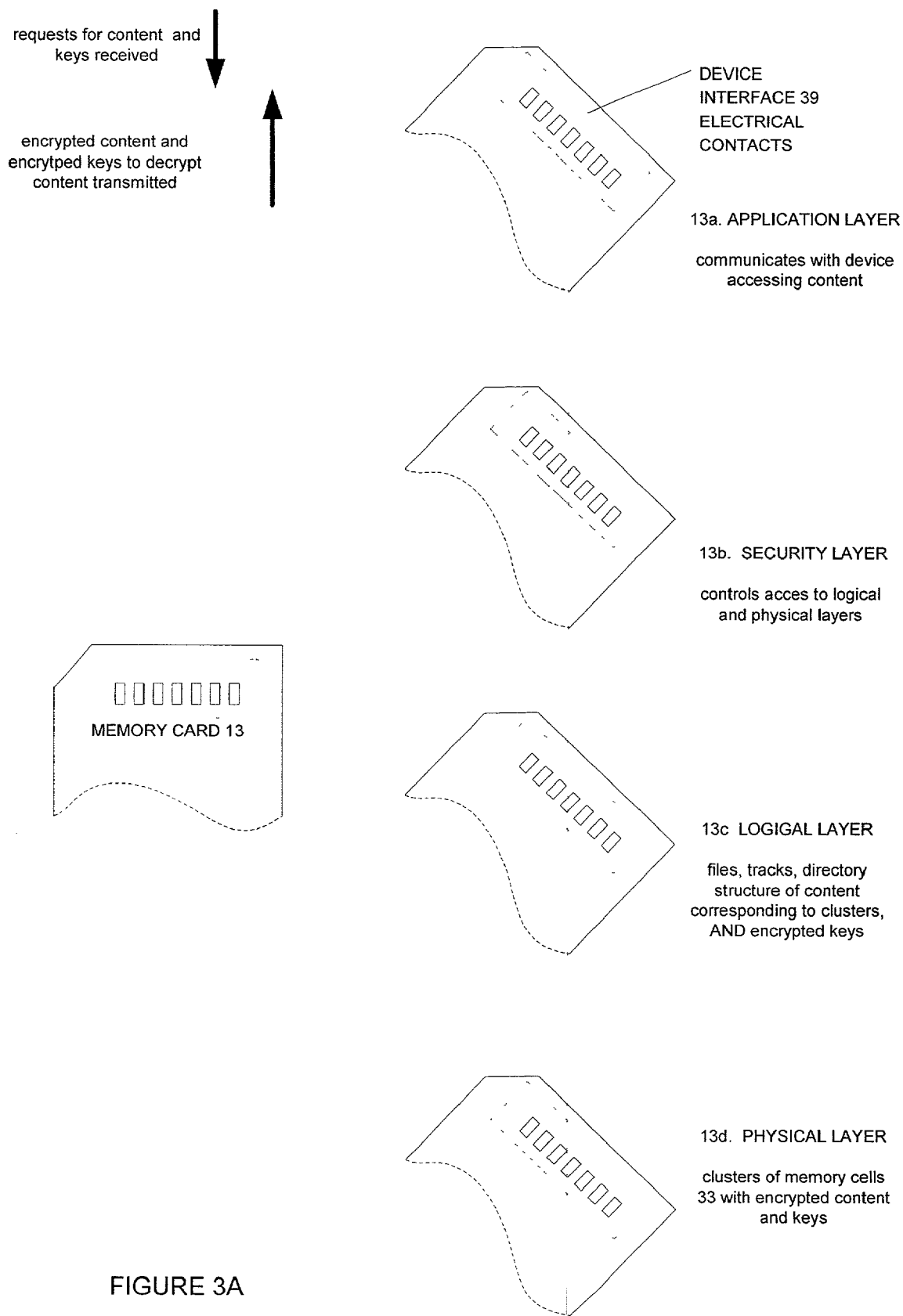
FIG. 3A is an abstract illustration of the layers of the secure media.

Referring to FIG. 3A, a memory card 13 can be thought of as having four distinct layers. Such layers may also be present in other types of secure media.

At its most basic level, data is stored in memory cells arranged in clusters on the physical layer 13d of memory card 13. The data is encrypted or secure if it is copyrighted material or otherwise worthy of encryption. Keys used to encrypt and decrypt the secure content are also encrypted and stored in a secure area of the physical layer.

The software of the present invention runs within a device to allow the device to store and retrieve encrypted information without the manufacturer (OEM) having to program very specific instructions to access the memory cells containing encrypted data and keys. It contains methods of sending the encrypted data to the device, decrypting the data within the device, and decompressing and playing audio, video and image files upon requests from the device. In short, a device need only send a command such as "play track." The software will accept the command, retrieve the encrypted data stored in the memory cells, retrieve the encrypted keys, organize and decrypt the data, decompress and format it, and play the song back.

Logical layer 13c contains the organizational structure for the memory cells and clusters of physical layer 13d. The two layers 13c and 13d contain and logically structure the memory of card 13. As card 13 is a secure card, security layer 13b controls and limits access to the secure data housed in the layers below.

Application layer 13a is the part of memory card 13 that communicates with a device accessing the content stored in the card. It does this through a device interface or contacts 39. Memory card 13 preferably includes a controller that manages the operation of the card and functionality of the application layer 13 together with control of all layers 13a–d of the card.

Figure 3B:
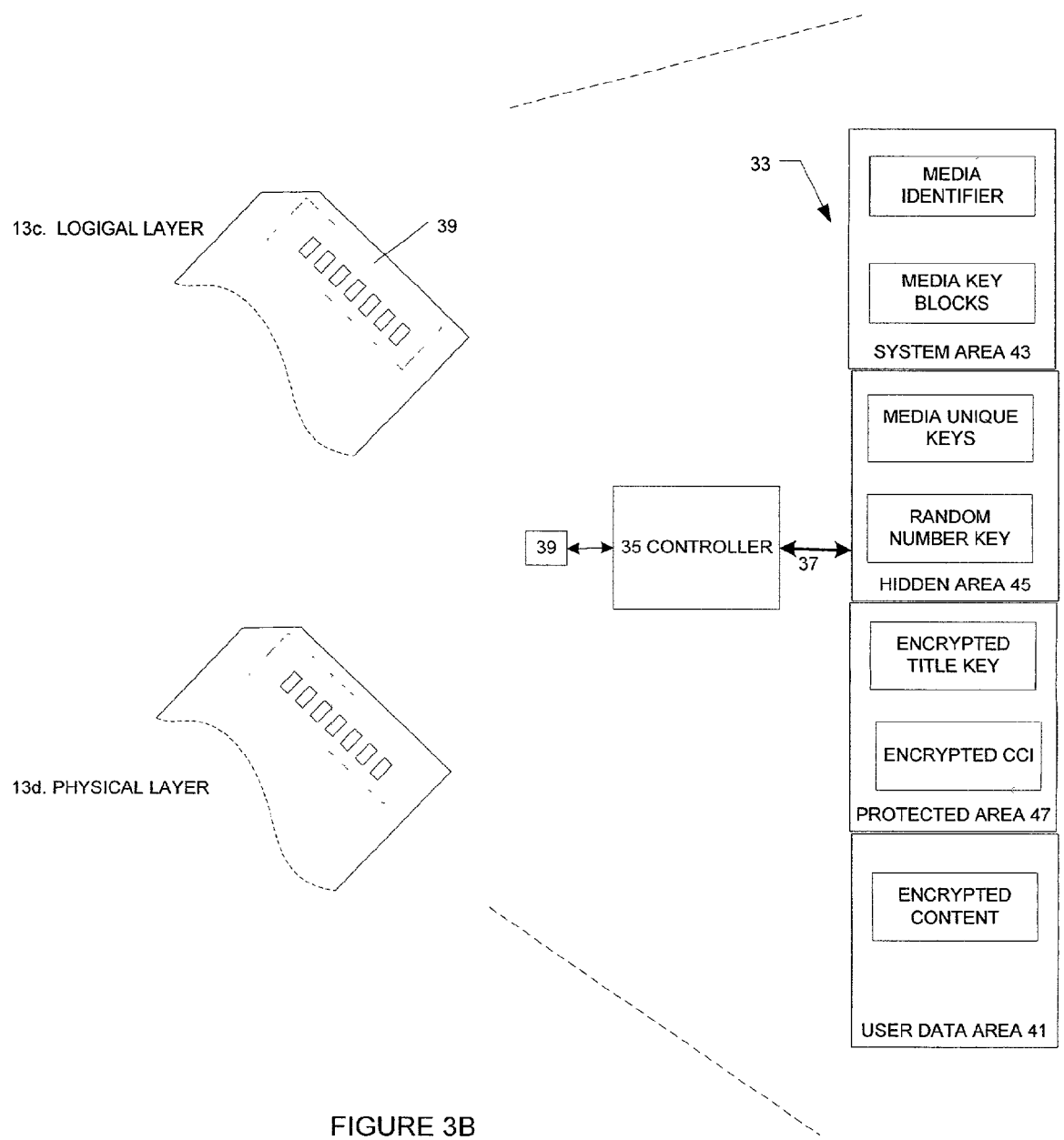
FIG. 3B is an illustration of the physical and logical structure of the memory cells of the secure media.

The physical and logical structure of a recording media, the SD card 13, according to the foregoing specifications, and corresponding to layers 13c and 13d of FIG. 3A, is illustrated in FIG. 3B. The card includes an array of memory cells 33 and a memory controller 35. User data, commands and status signals are communicated between the controller 35 and the memory array 33 over a circuit 37. The controller 35 communicates with a host device connected to a socket in which the card is inserted through a series of electrical contacts 39 on the card.

The memory cells of the array 33 are divided into the four non-overlapping areas of cells that are individually designated to store different types of data. A largest storage capacity area 41 is designated to store user data, in this case, encrypted audio, video or other data. The user data may or may not also include unencrypted data. A system area 43 of the memory stores a 64-bit media identifier ($ID_{media}$) of the card manufacturer, and 16 media key blocks (MKB) provided by the 4C Entity, each MKB having a maximum size of 4 k bytes, all being pre-recorded by the card manufacturer. One of the 16 MKBs is specified for use with audio user data, another for use with video user data, another for use of image data, and so on. The system area 43 is a write-protected area that is accessible for reading from outside of the card. A hidden area 45 carries 16 pre-recorded media unique keys ($K_{mu}$) corresponding to the 16 distinct media key blocks (MKB) stored in the system area 43. The hidden area 45 is a write-protected area that is accessible only by the memory card itself. A protected area 47 is a read/write area that is accessible only after a successful explicit mutual authentication has occurred. Randomly picked title keys ($K_t$) and copy control information (CCI) are stored in the protected area 47 in an encrypted form. Each piece (file) of content stored in the user data area 41 is encrypted with a unique title key that is also stored in an encrypted form in the protected area 47. The title keys and CCI stored in the protected area 47 are concatenated and encrypted together by the media unique key, which is unique for each memory card and stored in its hidden area 45. The file system of the user data area 41 is typically an ordinary FAT file system.

Figure 4:
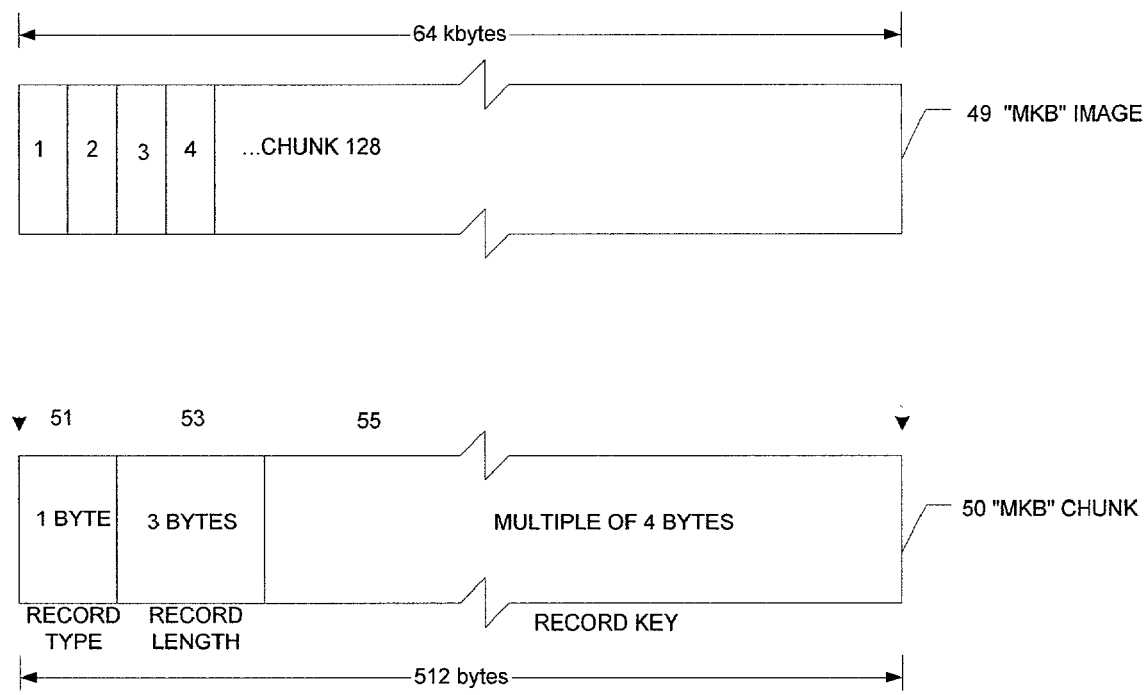
FIG. 4 is an illustration of a media key block (MKB) image broken into its component chunks.

The media key block (MKB), as stored in the system area 43 of the card memory, contains a sequence of contiguous records, one such record being illustrated in FIG. 4. The entire MKB image 49 is 64 Kbytes. It is broken into 128 chunks of 512 bytes, and chunk 1, which contains all or part of they first record, and is labeled MKB chunk 50 in the figure, is enlarged to show its component parts. Chunk 50 may also contain multiple records. A first field 51 contains the record type, a second field 53 the total length of the record, and the remaining field 55 the key itself. The data in the record type and length fields 51 and 53 are not encrypted. Each record of the MKB is a multiple of 4 bytes in total length. As illustrated by a block 57 of FIG. 5, the MKB key records are decrypted by device keys stored in the portable device (PD), licensed compliant module (LCM) or other device that utilizes a memory card for reading or programming content data stored on it. Device keys Kd1, Kd2, Kd3 . . . are written into a memory of the utilization device, such as non-volatile flash memory within the MCU 25 of the portable audio player of FIG. 2, by the manufacturer of the device. The device keys are provided to device manufacturers by the 4C Entity, and are maintained in confidence. The number of device keys which are stored in a given utilization device depends upon the type of the device.

Figure 5:
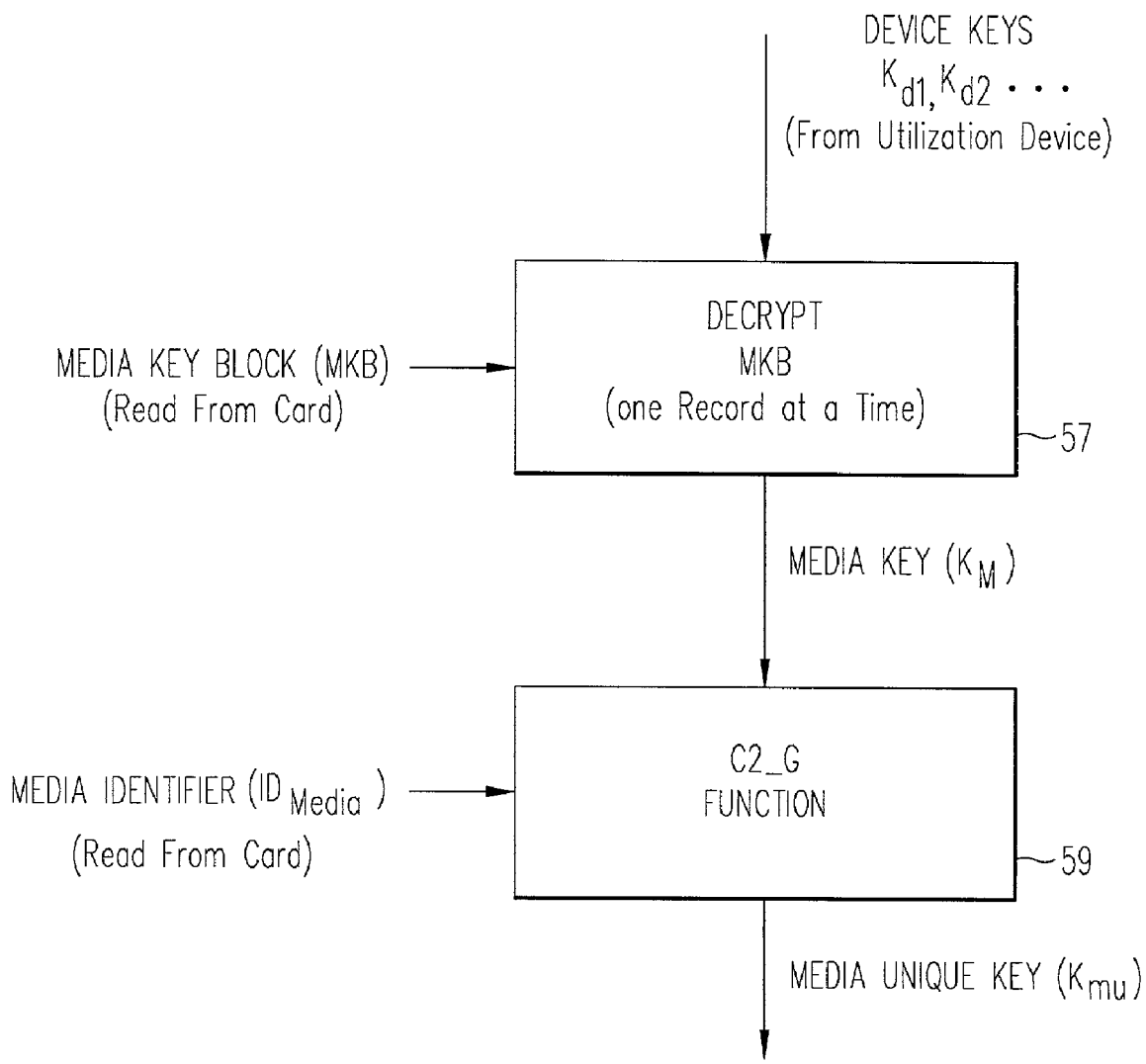
FIG. 5 is an illustration of a portion of the authentication and decryption process.
Figure 9:
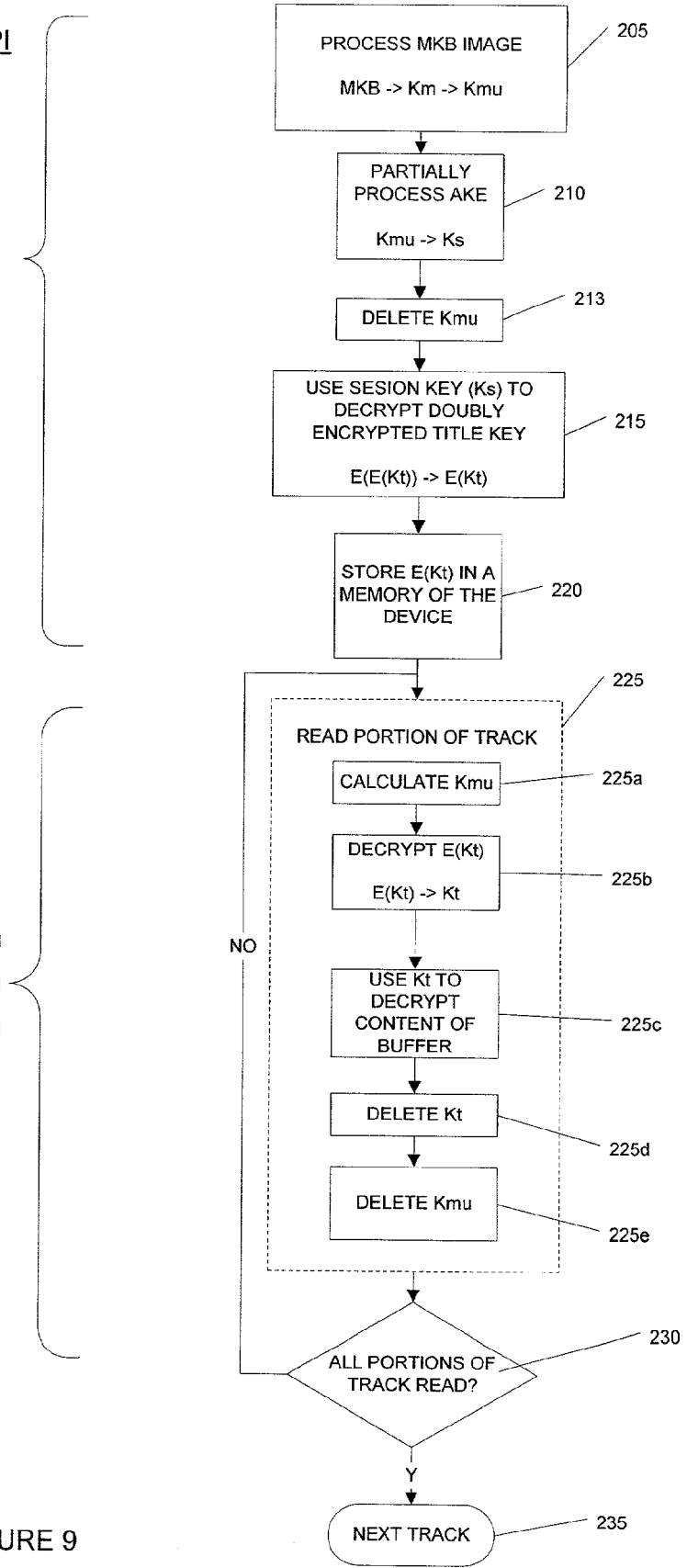
FIG. 9 is a flow chart overview of the playback of an audio track according to the present invention.
Figure 10:
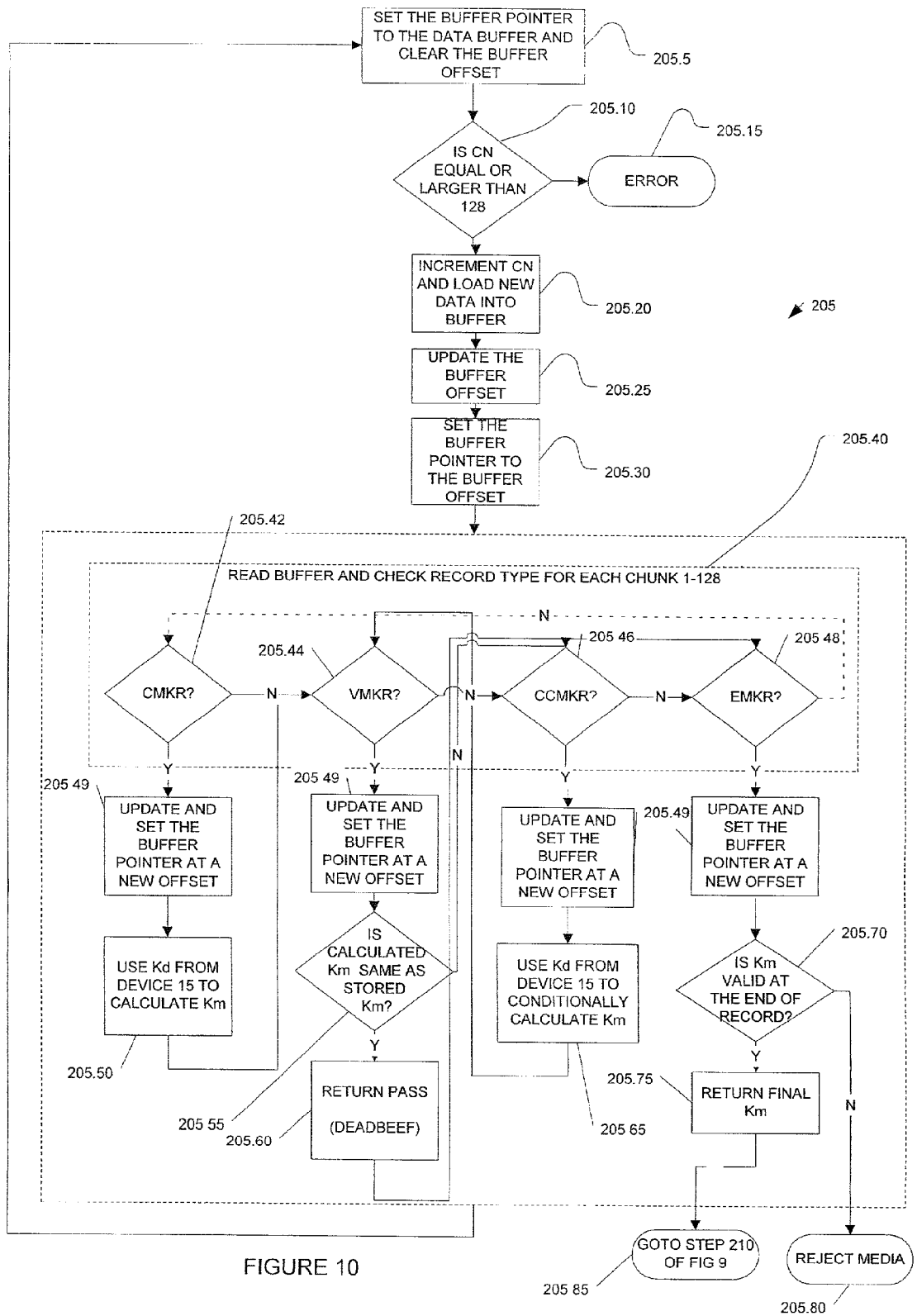
FIG. 10 is a flow chart of the processing of an MKB image seen in FIG. 4, a step of FIG. 9.

The utilization device (PD, LCM or other device) which performs the processing of FIG. 5 calculates the media key $K_m$ as part of the decryption of block 57, which is discussed in further detail with regard to FIGS. 9 and 10. Each record (FIG. 4) of the MKB read from the system area of an inserted memory card is usually processed in this manner. After processing of the MKB is completed, the most recently calculated $K_m$ value is taken as the secret media key output of the block 57. This media key $K_m$ and the media identifier $ID_{media}$ are combined by use of a C2 one-way function, as indicated by a block 59 of FIG. 5, to produce the media unique key $K_{mu}$. Additional details of this processing may be had by reference to the 4C Entity publications referenced previously.

Figure 6:
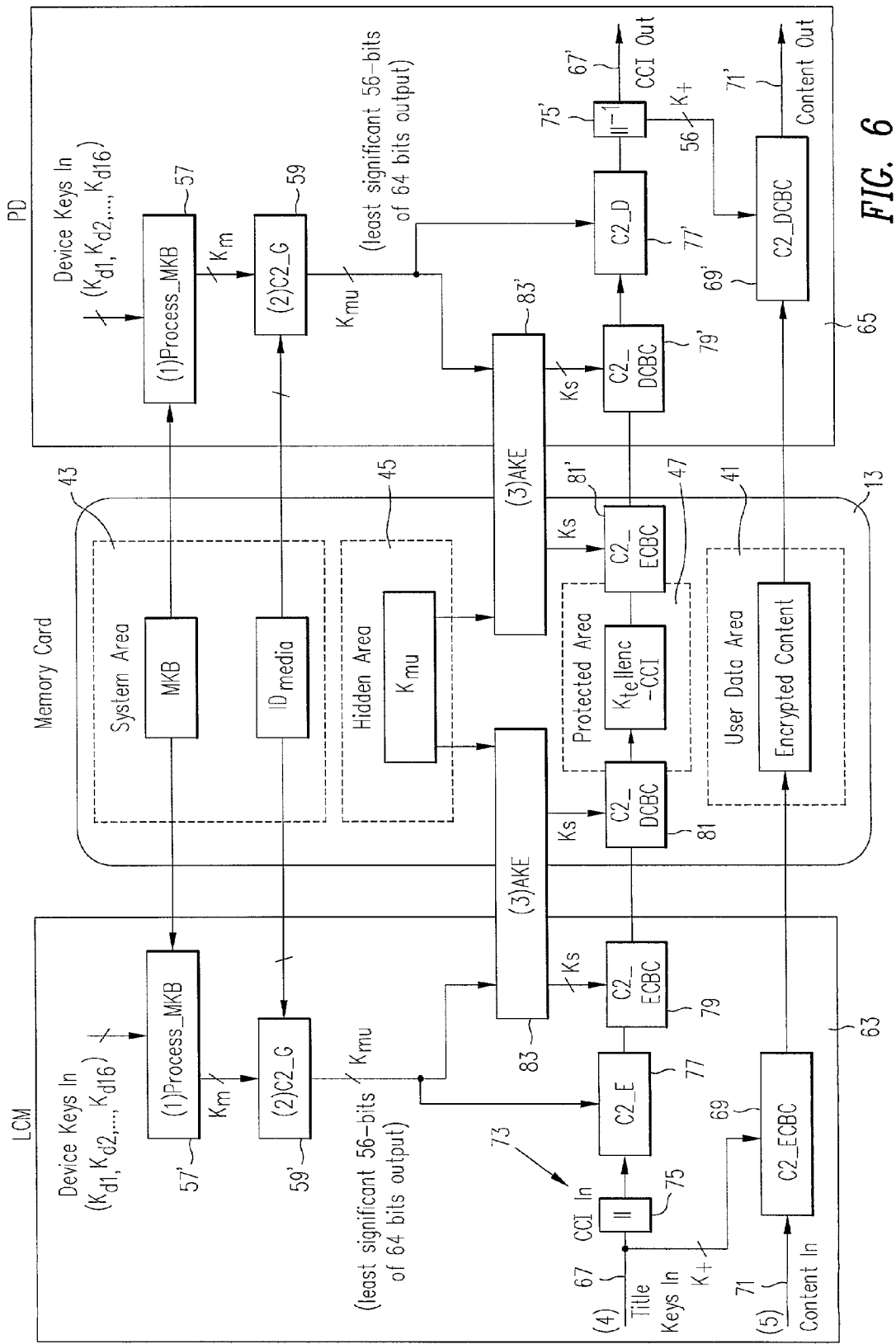
FIG. 6 is an illustration of the authentication and encryption process.

FIG. 6 illustrates all of the authentication and encryption processing that takes place when either recording audio content onto, or playing audio content from, a memory card 13 having the memory space allocation of FIG. 3. Processing that takes place in a personal computer or other LCM 63 is illustrated for recording audio or other content onto the card 13. Similarly, the processing of a portable audio or other utilization device 65 is shown for reading the recorded content from the card 13. Included in both is the processing described with respect to FIG. 5, the processing blocks 57 and 59 being part of the utilization device 65 and corresponding processing blocks 57' and 59' being part of the content recording system 63.

As part of recording content, an arbitrarily assigned title key $K_t$ is input at a line 67 for use by an encryption module 69 to encrypt one file (piece) of audio or other content input at line 71. The encrypted file is then stored in the user data area 41 of the memory card 13. In order to make the title key available for decrypting the recorded content, an encrypted version of the title key ($K_t$) is stored in the protected card memory area 47, as previously described. An encrypted version of the title key ($K_t$) is also stored in either system memory 27, RAM memory 25A of MCU 25, or RAM memory 31A of DSP 31. Storing the encrypted title key ($K_t$) in a memory of the device eliminates the need to access protected card memory area 47. This is significant because it saves considerable time and processing capacity in comparison to accessing the protected area 47 for each read. This will be discussed later with regard to FIG. 9. The title key $K_t$ and copy control information CCI are encrypted by a series of encryption modules 75, 77 and 79 in the LCM 63, and a module 81 on the memory card 61. The media unique key $K_{mu}$ is used by the module 77. An authentication key exchange (AKE) module 83 combines the media unique keys $K_{mu}$ as calculated by the module 59' and stored in the hidden area 45 of the card 61, to generate a session key $K_s$ that is used by each of the modules 79 and 81. In order for the utilization device 65 to decrypt the recorded encrypted content, corresponding modules, indicated with the same reference numbers but with a prime (') added, are utilized to perform an inverse of the encryption process.

Figure 7:
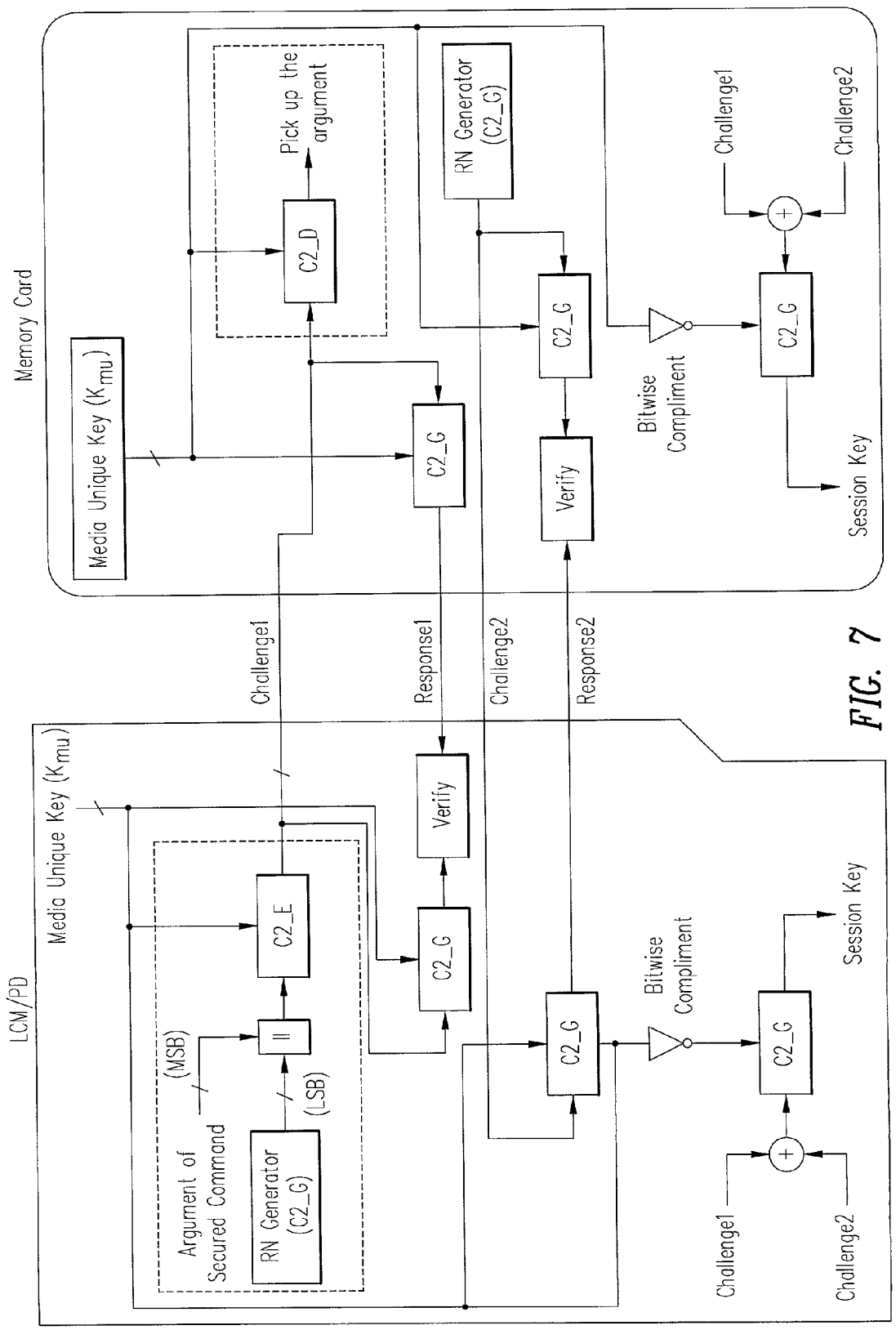
FIG. 7 is a schematic of the authentication key exchange process shown in FIG. 6.

FIG. 7 illustrates a technique for accessing the protected area 47 of a memory card, utilizing an authentication and key exchange (AKE) challenge-response protocol between a card and some LCM or utilization device. When this authentication is successful, the card and the other module or device share a secure common session key $K_s$. Additional details of the forgoing processing and protocols may be had by reference to the 4C Entity publications previously identified.

Performing accesses to the authentication area of the SD Memory Card requires using secret device keys that OEMs must license from the 4C Entity. as mentioned previously. Protecting these key values and restricting their exposure within SDK SW 100 software layers is one of the central considerations in the software design. Isolation of these keys (and other resultant values such as session keys) within a single internal module while enabling a secure media such as the SD memory card device driver to perform operations dependent on these values is achieved in a robust and secure interface methodology. Once again, the SD memory card is used to illustrate the invention; however, the invention can be used on any secure media such as CDs or other secure memory that may be in a card or even in a remotely located storage device.

Figure 8:
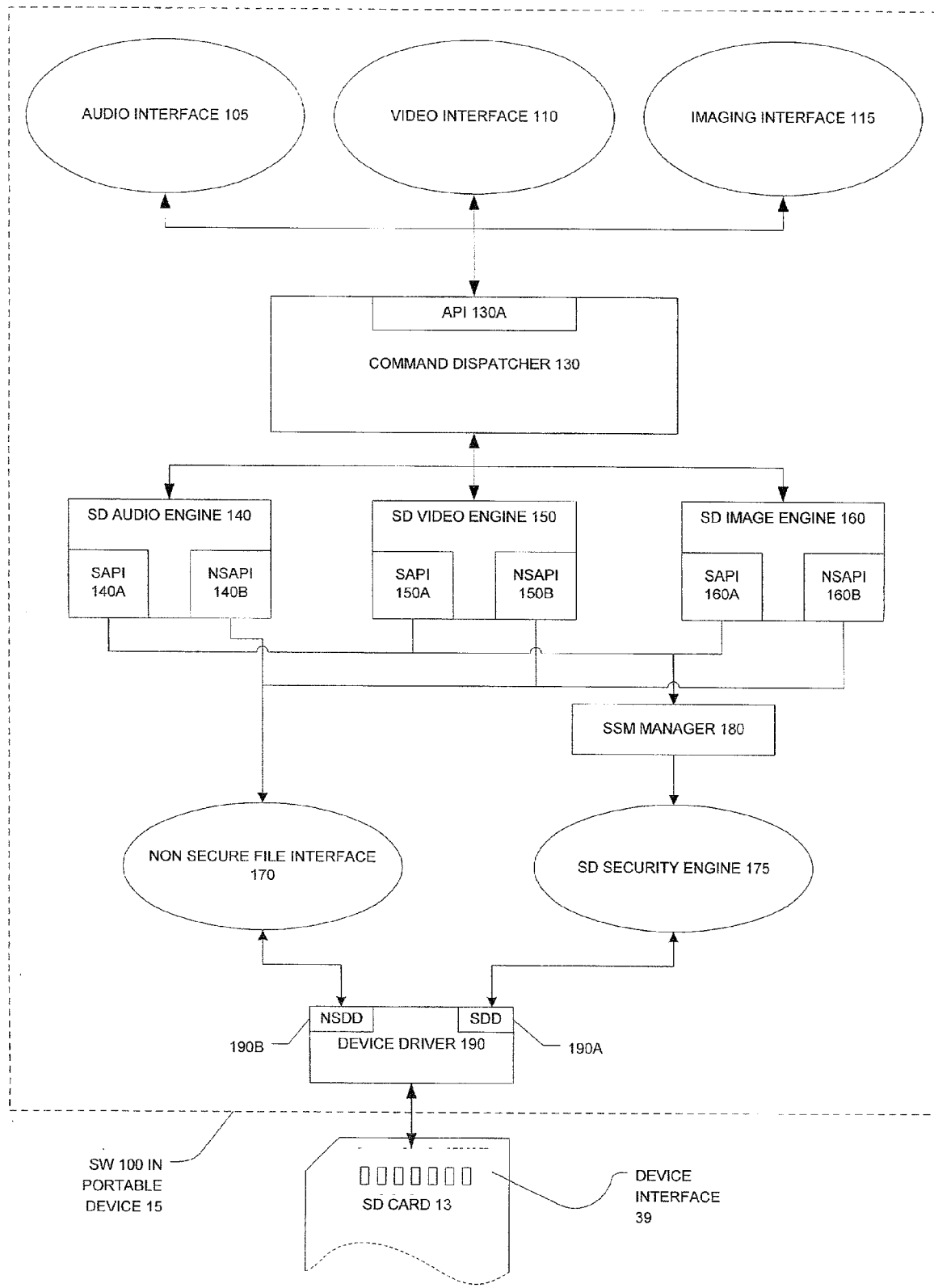
FIG. 8 is a block diagram illustrating the modules of the software of the present invention.

FIG. 8 illustrates an embodiment of a software system designed to run in a portable device or LCM in order to access information encrypted with the aforementioned processes. The SanDisk software, SW 100, is a complete turn-key software solution that enables OEM music players and recorders to readily support secure media including the secure digital (SD) memory card.

In FIG. 8, SW 100 is shown as ported into portable device 15 in order to access SD card 13. SW 100 may also be installed in any licensed compliant module such as a personal computer. Audio interface 105, video interface 110, and imaging interface 115 are the points of communication to the device. These interfaces provide a single point of communication for the device and generally receive simple commands from the device so that the device does not have to get involved with the intricacies of getting encrypted data from a secure media, then decrypting and processing the data. All of these complex processes are handled by SW 100. Interfaces 105, 110, and 115 also manage the arrangement of playback such as managing playlists and the correlation of images such as that of an artist with the songs of the artist or the various playlists. Application programming interface (API) 130A resides within command dispatcher (CD) 130. CD 130 and API 130A receive commands from interfaces 105, 110, and 1 15, relay information to the interfaces, and organize all of the processes that take place in the SW 100—the processes of device 15 related to the playback and recording of content stored on the secure media, with all of the requisite encryption, decryption, and compression algorithms. For more information on this seamless interface and control, see copending U.S. patent application Ser. No. 10/006,554, entitled "SYSTEM, METHOD, AND DEVICE FOR PLAYING BACK RECORDED AUDIO, VIDEO OR OTHER CONTENT FROM NON-VOLATILE MEMORY CARDS, COMPACT DISKS OR OTHER MEDIA," filed on the same day as this application and having the same inventors as this application.

SD audio engine (SDAE) 140, SD video engine (SDVE) 150, and SD image engine (SDIE) 160 respectively process audio, video, and image content residing on the secure media, upon receipt of instructions from CD 130. This means SDAE 140 can process any of the well known formats for audio, such as AAC, WMA, and MP3. Likewise SDVE 150 can process any of the well known formats for video clips such as Windows media files or real networks files MPEGs or any other well known type of video files. Finally, SDIE 160 can process any well known type of image files such as TIF, GIF, JPEG, bitmaps etc. . . . Each interface has a secure API (SAPI) and a non-secure API (NSAPI). The content processed may or may not be encrypted. Encrypted content is accessed through SAPIs 140A, 150A, and 160A. These SAPIs communicate with SanDisk security manager (SSM) 180. All commands having to do with secure content are channeled through SSM 180. Secure digital security engine (SDSE) 175, which will be described later in further detail, handles all encryption and decryption processes. Keys used to authenticate the media and decrypt the content are contained within and handled exclusively by SDSE 175. Unencrypted content residing on the card is accessed through NSAPI 140B, 150B, and 160B. These NSAPIs communicate with a non-secure file interface (NSFI) 170 in order to access unencrypted content on the media.

In order to read or write data in the storage media, NSFI 170 and SDSE 175 communicate with device driver 190. Device driver 190 in the example of the SD card manages and drives signals to and from the device interface 39's contacts of the SD card 13. Device driver 190 will be tailored to the specific type of device interface 39 of various devices or media. In the case of a memory card device, driver 190 manages and drives signals to and from contacts located on device 15. In the case of optical media, device driver 190 may manage and drive signals from various hardware components including an optical pick-up unit. Device driver 190 contains a secure device driver interface (SDDI) 190A, and a non-secure device driver interface (NSDDI) 190B. SDDI 190A and NSDDI 190B are isolated from each other within device driver 190. SDDI 190A communicates exclusively with SDSE 175, while NSDDI 190B communicates exclusively with NSFI 170.

Device keys and other values central to the SD-Audio security scheme are housed within one restricted security software module, SD security engine (SDSE) 175. All manipulation of these values is solely restricted to this module. Values are never passed in or out to software layers above SDSE 175. All requests for the security services involving these keys are controlled and monitored by SSM 180 that shields this security module. Beneath the security module, the SD Memory Card device driver 190 carries out security accesses. Requests for these driver services are made via a private driver security interface, secure device driver interface (SDDI) 190A, that is only known to the security module. SDSE 175 uses this interface 190A to perform special security commands such as Get Media Key Block (MKB). Non-secure device driver interface (NSDDI) 190B also utilizes device driver 190 to access any unencrypted files in user area 41 of card 13.

The security of SW 100 architecture resides in the security of its keys. Secret "soft keys" are not stored in temporary secure areas for a long period of time, since this increases the possibility of comprising the keys and thus the encrypted content. SW 100 utilizes a scheme within SDSE 175 of dynamically generating the needed keys (or "soft keys") and deleting them when there is no immediate need for those specific keys.

Operation of SW 100 is now described in more detail. Within the SW 100, commands are issued to the device which require the OEM's 4C-licensed device keys to be used. All processing of these keys is solely limited to the SDSE 175 module which is housed beneath the SSM 180.

When SSM 180 receives a request for security services, it carries it out by passing the command request packet to the process_security function within SDSE 175. Key values are never contained within the request packets or exposed at software layers above SDSE 175.

When needed internally by SDSE 175, device keys are retrieved via a function call into an OEM-supplied library. The library of SDSE 175, security lib, contains the following APIs designed to reduce the time that a decrypted key resides in the secure area of the system:

1) SEC_AKE API;
2) SEC_ENC_TKEY API;
3) SEC_DEC_TKEY API;
4) SEC_GETCCI API;
5) SEC_UPDATECCI API; and The functionality and the structure of SW 100 are described in the text of this application and more specifically, the functionality of APIs 1–5 above are shown within the flowchart of FIG. 9. The APIs are shown next to the corresponding functions that they implement. Further detail of the implementation of these APIs, as well as all of SW 100, can be seen in the source code that submitted in an appendix of this application. That source code forms a part of this application, and is hereby expressly incorporated by this reference.

Once obtained, the device key is combined with the Media Key Block (MKB) from the SD Memory Card to form the "media key." This value is kept within SDSE 175 for use in processing subsequent requests. Note, however, the "unique media key" ($K_{mu}$) is never retained inside SDSE 175. This value, which forms the basis for all security accesses, is always calculated on a real-time basis (and never cached) as an extra security precaution. Detailed description of the processing of the keys within SDSE 175 follows.

The encryption process is in general terms designed to stop unauthorized copying of the content located on the secure media. There are many aspects of the invention that achieve this. First, an entire file, for example, a song, is never decrypted at once and stored into memory where it may be vulnerable. The portable device allocates a buffer and SDSE 175 reads chunks of encrypted content at a time, decrypts it, and then writes over the same buffer over and over again until the end of the file.

As was seen in FIGS. 6 and 7, the media unique key ($K_{mu}$) and title key ($K_t$) are the keys finally used to decrypt the content. There are many ways to protect the title key. One is to store the keys in a very secure area of device 15, another is to read the title key from the protected area 47 of card 13 each time the encrypted buffer is read and decrypted. FIG. 9 is a flow chart depicting the preferred method.

Returning to FIG. 9, in step 205, an MKB image, which, as seen in FIG. 4, is 64 kilobytes, is read to process the media key ($K_m$), as seen in FIG. 6, to yield the media unique key ($K_{mu}$). This step is further detailed in FIG. 10 which will be described later. After mutual authentication of the device and the media is complete in step 205, the AKE process is undergone to yield a session key ($K_s$) that can only be used during that session (as long as the device is turned on or is in an active state) in step 210. The AKE process can be seen by referring once again to FIG. 6. In step 213, the media unique key ($K_{mu}$) is deleted. In step 215, the session key ($K_s$) is used to decrypt the doubly encrypted title key $E(E(K_t))$ stored in protected area 47 of memory card 13. The result is a singly encrypted title key ($E(K_t)$). In step 220, this encrypted title key ($E(K_t)$) is stored in a memory of the device 15. The ($E(K_t)$) may be stored in system memory 27, RAM memory 25A of MCU 25, or RAM memory 31 A of DSP 31. The title key $K_t$ is specific for each title, referred to as a track in the realm of audio and on FIG. 9 used to illustrate the invention. Each track may be made of multiple files, for example, in the case of a long classical song. For large video clips, a title may comprise many files. Thus, for all subsequent reading and decryption of the encrypted content of the track, the title key need not be retrieved from the memory card because it is stored in a local memory, and precious time and computing resources can be saved, while at the same time, the title key remains encrypted for security purposes.

In step 225, a portion of the track is played back. This portion may be in any of the files that comprise the track. In step 225a, the media unique key ($K_{mu}$) is calculated once again. In step 225b, the encrypted title key stored in local memory is decrypted. Then, in step 225c, the title key is used to decrypt the content from the buffer of device 15 containing content from the user area 41 of card memory card 13. Immediately after the buffer is decrypted, the title key is deleted in step 225d and the media unique key is deleted in step 225e. The order of steps 225d and 225e is not important, but it is important that both keys are only exposed for the time it takes to read a portion of the track. This portion may be anywhere from a fraction of a second of playback (decrypted, decompressed, and decoded) content, audio or otherwise, to about ten seconds. Preferably it is two seconds. The time it takes to read the portion is dependent on many factors including the processing speed and the buffer size of the device. As discussed previously, SW 100 can be executed by either the MCU 25 or DSP 31 and stored in any of the memory 27, 25A, 31A or 32 of device 15, thus, the processing times can vary. This is repeated until all portions of the track are read as seen in step 230. Once all portions have been read the system can move on to the next track, as shown in step 235, if playback is to continue. This may be the case, for example, if the user has chosen to play an entire playlist.

When the all portions of track have been read and the reading of the next track is to commence, the process will begin again at step 215 and will retrieve the next doubly encrypted title key from the protected area 47 of card 13. This is generally the case if the user has set the device in motion to play an entire playlist that includes multiple tracks. If the session is closed (i.e., device 15 has been turned on or off), then a new session key will have to be generated and the process will initiate at step 210. If memory card is removed or freshly inserted, the device and media will have to be re-authenticated and the process will begin again at step 205 in order to read a track.

FIG. 10 describes the operation of processing the Media Key Block, step 205 of FIG. 9 described above. As was seen in FIG. 4, an MKB image 49 is 64 Kbytes in length. Reading the entire image 49 at once to calculate the MKB would be inefficient, requiring a large RAM and long processing times. The present system reduces RAM requirements and decreases processing time. The MKB image 49 is divided into chunks 1 through 128. Each chunk is 512 bytes and may contain one of four different types of records of the MKB: the verify media key record (VMKR) known as 0x81; the calculate media key record (CMKR) known as 0x01; the conditionally calculate media key record (CCMKR) known as 0x82; or the end media key record (EMKR) known as 0x02. These records are described in the Content Protection for Recordable Media (CPRM) Specification of the 4C Entity, referenced above.

In this example, the chunk length and the buffer length are the same. However, the buffer length and chunk length can both range from 256 bytes to 4096 bytes. Each record is examined to perform specific operations based on the record type and certain data will be saved for later to obtain the Media Key. The record length is added to the total length of the buffer offset every time a record is identified. The chunk number is calculated by dividing the total length with the chunk length. The chunk number is the index to the Media Key Block of a selected chunk data. The remainder of the total length is the offset to the selected chunk data. The row and column are used to figure out where the encrypted media key and the conditional encrypted media key are. Those encrypted keys are saved and the decryption C2 cipher in Electronic Codebook Mode algorithm is performed to obtain the Media Key. This Media Key is then verified for a correct final Media Key ($K_m$).

The number of reads, T, required per MKB chunk for obtaining the Media Key ($K_m$) from the MKB associated with the number of records is shown below:

Number of Records<$T$<(Number of records*2)

T: Number of times required for accessing MKB chunks

Each record has different length and data values. The information of each record can be obtained within two reads. Since there are four records, between 4 and 8 reads will be necessary to process the MKB chunk and obtain the records.

Therefore, the number of reads, T, are:

4<T<8

Suppose that it takes N ms to access 512-byte of MKB data. It will take (128*N)ms to access an entire 64K MKB image to obtain the Media Key from the first method. It only takes, from the second method, (8*N)ms, as the worst case scenario, to obtain the Media Key. Thus, there is a considerable time saved using this scheme. On the average, to obtain the Media Key ($K_m$), the number of reads would be in the range of 4 to 6, and the time necessary would be proportionately less than shown above.

Step 205 of FIG. 9, expanded here in FIG. 10, is performed until a final media key is produced in step 205.75 or the media is rejected in step 205.80. Not all of the 128 chunks need to be read, and not all of the 512 bytes per chunk need to be read in order to calculate the media key. Processing MKB data is an operation that requires requesting a chunk of data at a time, pointing to the desired location within that specific chunk and computing the obtained values. Not all MKB data is needed. The algorithm depicted in FIG. 10 will provide a mathematical calculation to figure out exactly what chunk of MKB data is needed, what record should be processed and where the encrypted data is located.

In step 205.5, the buffer pointer is set to the data buffer and the buffer offset is cleared. Next, in step 205.10, the chunk number is checked to see if it is equal to or larger than the maximum chunk number. If it is, an error will be returned in step 205.15. If it is not, the chunk number will be incremented and new data will be loaded into the buffer in step 205.20. Then the buffer offset will be updated in step 205.25. Thus, the pointer can be set to the correct location (the chunk number plus offset). In step 205.30, the buffer pointer is set to the buffer offset. In step 205.40 the buffer is read starting at the offset where the pointer is located. The system will then determine what type of record it is reading. As seen in step 205.40, the system will first check what type of record is being read, and what record length is associated with that record. The actions that will follow differ depending upon the record type and length. The record length of each record will be used to determine where the buffer pointer should be located in reading the subsequent record. This is reflected by steps 205.49, updating the buffer offset and setting the buffer pointer at the new offset.

If the record is a CMKR as shown in step 205.42, then the system updates the buffer chunk number and offset to the correct MKB location where the encrypted media key ($K_m$)is located in step 205.49. Each card has 16 MKBs. Thus, the system will get the offset where the encrypted media key is, go to the specific MKB chunk number, allocate buffer (16 blocks×512 bytes), and go to the offset within each block to read the encrypted media key. Then the system uses a device key ($K_d$) supplied from device 15 to decrypt (calculate) the media key in step 205.50. Once the media key has been calculated the next step is to verify the media key.

If the record is a VMKR as evaluated in step 205.44, the media key that was previously calculated, either on the first attempt in step 205.50, or in a subsequent attempt in step 205.65, will be compared to a reference media key ($K_m$) in step 205.55. In order to do this, reference media key will first be stored locally. If the key is the same a pass will be returned, which in hex is DEADBEEF, and the system will not need to conditionally calculate the media key. In order to figure out where to start reading the next record, the record length of the VMKR is used to move the buffer pointer to the next record. If it is not the same it then it will be calculated again when a CCMKR record is read in step 205.46. When this record is read, the media key will be calculated once again in step 205.65 after the buffer point has been set to read at the updated buffer offset in step 205.49, and then it will be subsequently verified when the next VMKR is read. The maximum number of times the CCMKR is calculated may be set by the system and preferably one.

The first calculation takes place when a CMKR is found. If it is successfully calculated, as determined during the verification process initiated when a VMKR is found, then there will be no need to conditionally calculate the media key ($K_m$). If the verification is unsuccessful then when a CCMKR is found the media key ($K_m$) will be recalculated and reverified. This means that there are two chances to calculate the media key. Finally, if the record is an EMKR as evaluated in step 205.48, then in step 205.75 the system will verify that at the end of the record a valid media key ($K_m$) is present, and in step 205.75 the final media key ($K_m$) will be produced, after the buffer pointer is set at a the proper offset for this type of record in step 205.49. If, however, a valid media key is not returned in step 205.70, the media will be rejected in step 205.80. If the final media key is returned in step 205.70, the processing will continue at step 210 of FIG. 9, as shown by step 205.85. Thus the MKB process is complete.

Functions within SDSE 175 perform security accesses such as Get MKB by using a secure device driver interface (SDDI) 190A to device driver 190. This same device driver, SDDI 190a also makes use of functions within SDSE 175 which it can call directly. For example, prior to issuing a read of the authentication area, SDDI 190a must first call the sec_ake function within SDSE 175. The sec_ake function will in turn call back into SDDI 190a. This "dual calling relationship" which facilitates the isolation of the device key within SDSE 175 is unique to SW 100s implementation of the SD-Audio standards.

Since SDSE 175 handles all key-oriented processing, and these values are needed when certain SD commands are received by the audio interface 105, video interface 110, or image interface 115, the device driver must make use of functions within SDSE 175 which it can call directly. When carrying out the functions, SDSE module 175 must in turn call back into the device driver 190's private security interface, SDDI 190A. This "dual calling relationship" allows interwoven requests between SDSE 175 and device driver 190, thus enabling key values to be isolated within the security module.

The SDSE 175 software layer invokes security device driver services via the private interface by initiating a security driver request packet and calling the security driver interface entry point passing a request packet pointer.

In order to clarify the appended source code which has been incorporated by reference, the following tables are provided.

The request packet (defined in sdapi.h) consists of a data type SSMSERVE which is defined as follows:

| Variable | Variable name |
|---|---|
| Typedef struct_mySecuredDrv { | |
| Data buffer | UCHAR *buffer |
| Number of data blocks | UINT16 noBlocks |
| Application unique Number | UINT16 mkb_ID |
| Start address | UINT16 lba |
| Security flag | INT16 securityFlag |
| Drive number | INT16 driveNo |
| Command index | INT16 opCode |

Command index (INT16 opCode) holds the command for the service being requested. Supported commands include:

| Command | Functional Code Routine |
|---|---|
| Device identify | #define SDDRV_IDENT 0 |
| Security identify | #define SDDRV_SECIDENT 1 |

-continued

| Command | Functional Code Routine |
|---|---|
| Secure read | #define SDDRV_SECRD 2 |
| Secure write | #define SDDRV_SECWR 3 |
| Secure erase | #define SDDRV_SECERASE 4 |
| Read MKB | #define SDDRV_RDMKB 5 |
| Get MID | #define SDDRV_GETMID 6 |
| Set challenge | #define SDDRV_SETCHALGE 7 |
| Get challenge | #define SDDRV_GETCHALGE 8 |
| Set response | #define SDDRV_SETRESP 9 |
| Get response | #define SDDRV_GETRESP 10 |
| Change size of protected area | #define SDDRV_CHANGESA 11 |

Security device driver service requests are issued from the SDSE 175 module. For example, the Generate Challenge 1 function sends challenge 1 as follows:

Generate Challenge 1

| Command | Operation |
|---|---|
| Call security routine | SDSECURITYDRV mySecDrv |
| Set drive number | mySecDrv.driveNo = (INT16)drv |
| Set memory address within media | mySecDrv.lba = 0 |
| Number of data blocks | mySecDrv.noBlocks = 1 |
| Set challenge | mySecDrv.opCode = SDDRV_SETCHALGE |
| Send challenge 1 | mySecDrv.buffer = Chlg1 |
| Call to device driver | scDDHandler(&mySecDrv) |

Because all key manipulation is confined to SDSE 175, SSDI 190a must rely on SDSE 175 functions to perform Authentication Key Exchange (AKE) or for decrypting data that has been transferred across the bus (note that all data sent across the bus is first encrypted using the "session key" which is generated from each AKE.)

When performing the AKE, SDSE 175 must send commands to the SD Memory Card 13, thus, it must in turn call into SDDI 190a. This calling relationship is outlined in the diagram of FIG. 7 which depicts the steps necessary to process a read of the authentication area.

Notice that the sec_ake function within the SDSE 175, when called by the security SDDI 190a, performs four calls back into the security device driver via the private driver interface. These four requests consist of: SDDRV_SETCH-ALGE, SDDRV_GETCHALGE, SDDRV_SETRESP, and SDDRV_GETRESP. This enables the security module to carry out the requisite set challenge/get challenge, set response/get response steps seen in FIG. 7. The resultant session key is stored within the security module. This is used to decrypt data when the security device driver calls into the SDSE 175's bus_decrypt function to get information from SDDI 190a.

Random Number Generation

The AKE process 83 seen in FIGS. 6 and 7 requires generation of a random number. Implementation of SD random number generation (RNG) requires computation of a random number Seed V(t+1) based on the previous Random Number Vt. Random Number Seed V(t+1) needs to be stored in Flash memory and will be used as the seed for the generation of next random number. This random number and seed are used in the C2_G, a C2 Cipher one-way function.

In low cost computing platforms where it is not possible to re-write Random Number Seed Vt+1 (i.e., no EEPROM designated for Seed storage) RNG implementation may create a problem.

If the program uses a fixed number or a predictable number as the seed of the random number generator, a hacker may break the copy protection or steal the keys. With a fixed seed, the first random number and the challenge are also fixed if the same SD card address is to be accessed. By tracking the response, the unique media key may possibly be stolen. Here we utilize the system timer as a solution for PC applications. In order to ensure that the timer generated seed is not predictable, we shuffle the timer so that every byte of the random number seed is random. On systems such as Microchip PIC16xxx, the Timer 1, which is the number of instructions executed, can be used as a seed of random number generation after shuffling.

The main idea is to use more than one timer that is always incrementing, and manipulate the frequency of the slowest updating (most significant) bytes such that they update at a higher frequency. The values of the slowest updating (most significant) bytes will be calculated as a function of the fastest updating (least significant) bytes. One method of random number generation utilizes the system timer. It uses 4 bytes of the processor clock and 4 bytes of the Universal Coordinated Time. The processor clock is the number of processor time since the program starts. This time is refined to CLOCKS_PER_SECONDS which is 60 in this application. It is obtained through the Microsoft C++ runtime function "clock( )". The Universal Coordinated Time is obtained through the Microsoft C++ runtime function "time( )". It is the number of seconds from midnight, Dec. 31, 1899.

Processor clocks are read into the bytes 0–3, and the universal coordinate time is read into bytes 4–7. Bytes 0 and 1 change rapidly, while bytes 2 and 3 change less rapidly. Thus, we can increase the rate of change of bytes 2 and 3 by making bytes 2 and 3 change at a pace based upon the pace that bytes 0 and 1 change at. This can be accomplished a number of ways. For example, with an exclusive OR function:

$$vt\_1[2]=vt\_1[2]\hat{}\,vt\_1[0]$$

$$vt\_1[3]=vt\_1[3]\hat{}\,vt\_1[1]\hat{}\,vt\_1[0].$$

Similarly, bytes 6 and 7 can be made to change at a faster pace by the following example:

$$Vt\_1[6]=vt\_1[0]+vt\_1[1]+vt\_1[2]+vt\_1[3]+vt\_1[4]+vt\_1[5]+vt\_1[6]$$

$$Vt\_1[7]=vt\_1[0]\hat{}\,vt\_1[1]\hat{}\,vy\_1[2]\hat{}\,vt\_1[3]\hat{}\,vt\_1[4]\hat{}\,vt\_1[5]\hat{}\,vt\_1[6]vt\_1[7].$$

Increasing the pace of the change can also be achieved by using multiples of the timer values at certain byte locations or by other methods of making the slow moving bytes dependent upon the faster moving bytes. For more detail, please refer to the attached source code that forms part of this application.

Consequently, applying the C2 cipher on the fixed seed will generate a new random number seed V(t+1). The C2_G is a C2 Cipher One-way function. It applies the random number key "c1" on fixed seed "v0" to generate different initial seed "v1" for the first AKE.

The CurrentTime is an assembly program using DOS software interrupt "1A" function "0" to read the timer ticks. The following is the code of_CurrentTime PROC NEAR: push cx; mov ax,0; int lah; mov ax,dx; mov dx,cx; pop cx; ret; _CurrentTime ENDP.

Advantages

The system and method of the present invention are advantageous over prior techniques in many ways. Device keys and resultant session keys are manipulated in a very isolated and protected software layer. These are never exposed in upper layers. Even the lower device driver layer is not given direct access to the keys. Device keys are retrieved from an OEM-supplied library when generating the media key. This key is retained within the security engine, but the media unique key ($K_{mu}$) which is the heart of the security scheme is never stored. A private interface to security engine enables the security engine to gain low-level access to the memory card while keeping the exposure of all security-related keys (e.g., device keys, media keys, session keys) confined within the security engine. A "dual calling relationship" allows the security engine and the security device driver to make interwoven use of each other's services.

While particular embodiments of the present invention and their advantages have been shown and described, it should be understood that various changes, substitutions, and alterations can be made therein without departing from the spirit and scope of the invention as defined by the appended Claims. For example, although usage of an SD memory card has been shown to illustrate the functioning of the invention, the invention can be used on any media having encrypted content. It can also be utilized by any type of device.

The invention claimed is:

1. A method of accessing an encrypted track on a removable media with a device, the track comprising frames having content, the method comprising:
   authorizing the media by a process comprising:
   calculating a media key; and thereafter
   calculating a media unique key from the media key; and thereafter
   deleting the media key; and thereafter
   calculating a session key from the media unique key; and thereafter
   deleting the media unique key; and
   decrypting the track by a process comprising:
   (a) calculating a media unique key; and thereafter
   (b) decrypting a title key stored in the memory of the device with the media unique key; and thereafter
   (c) decrypting a group of frames; and thereafter
   (d) deleting the decrypted title key;
   (e) deleting the media unique key; and
   (f) repeating (a) through (e) until the entire track is completed.

2. The method of claim 1, wherein calculating the media key comprises:
   (a) reading a first record of a media key block from a buffer;
   (b) updating the buffer offset based on the length and type of the first record;
   (c) reading another record of the media key block at the updated buffer offset; and
   (d) repeating (a)–(c) until all necessary records of the media key block are read and the media key is calculated.

3. The method of claim 1, wherein the group of frames comprises less than one to about five seconds of content in a decoded or decompressed form.

4. The method of claim 1, wherein decrypting the track comprises decrypting one or more files, the files comprising the frames.

5. The method of claim 1, further comprising decoding and decompressing the track.

6. A method of accessing an encrypted data file on a removable media with a device, the data file comprising frames having content, the method comprising:
- authorizing the media for a user session by a process comprising:
  - calculating a media key; and thereafter
  - calculating a media unique key from the media key; and thereafter
  - deleting the media key; and thereafter
  - calculating a session key from the media unique key; and thereafter
  - deleting the media unique key;
- decrypting a doubly encrypted title key stored in the media with the session key to produce a singly encrypted title key;
- copying the singly encrypted title key from the media into a memory of the device; and
- decrypting the file by a process comprising:
  - (a) calculating the media unique key; and thereafter
  - (b) decrypting the title key stored in the memory of the device with the media unique key; and thereafter
  - (c) decrypting a group of frames; and thereafter
  - (d) deleting the decrypted title key;
  - (e) deleting the media unique key;
  - (f) repeating (a) through (e) until the entire file is completed.

7. The method of claim 6, wherein calculating the media key comprises:
- dividing a media key block into chunks, the chunks comprising bytes of encrypted data; and
- decrypting a key within the media key block by setting the buffer to read at an offset within a specific chunk of the block.

8. The method of claim 7, wherein decrypting the key comprises:
- (a) calculating a media key from a first record; and
- (b) updating the buffer offset; and
- (c) reading a second record at the updated buffer offset; and
- (d) verifying the media key with a second record by comparing the calculated media key with a reference media key.

9. The method of claim 8, wherein the buffer offset is determined by the type and length of the first record of the media key block.

10. The method of claim 6, wherein the group of frames comprises less than one second to about five seconds of decompressed and decoded audio content.

* * * * *